(12) United States Patent
Lawson et al.

(10) Patent No.: US 8,306,021 B2
(45) Date of Patent: Nov. 6, 2012

(54) SYSTEM AND METHOD FOR PROCESSING TELEPHONY SESSIONS

(75) Inventors: Jeffrey Lawson, San Francisco, CA (US); John Wolthuis, San Francisco, CA (US); Evan Cooke, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 844 days.

(21) Appl. No.: 12/417,630

(22) Filed: Apr. 2, 2009

(65) Prior Publication Data

US 2009/0252159 A1 Oct. 8, 2009

Related U.S. Application Data

(60) Provisional application No. 61/041,829, filed on Apr. 2, 2008, provisional application No. 61/055,417, filed on May 22, 2008, provisional application No. 61/100,578, filed on Sep. 26, 2008, provisional application No. 61/156,746, filed on Mar. 2, 2009, provisional application No. 61/156,751, filed on Mar. 2, 2009.

(51) Int. Cl.
*H04L 12/66* (2006.01)

(52) U.S. Cl. ........................................ 370/352

(58) Field of Classification Search .......... None
See application file for complete search history.

(56) References Cited

U.S. PATENT DOCUMENTS

| | | | |
|---|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,269,336 B1 | 7/2001 | Ladd et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |

(Continued)

FOREIGN PATENT DOCUMENTS

DE 1684587 A 3/1971

(Continued)

*Primary Examiner* — Chirag Shah
*Assistant Examiner* — Minh-Trang Nguyen
(74) *Attorney, Agent, or Firm* — Jeffrey Schox

(57) ABSTRACT

In one embodiment, the method of processing telephony sessions includes: communicating with an application server using an application layer protocol; processing telephony instructions with a call router; and creating call router resources accessible through a call router Application Programming Interface (API). In another embodiment, the system for processing telephony sessions includes: a call router, a URI for an application server, a telephony instruction executed by the call router, and a call router API resource.

20 Claims, 16 Drawing Sheets

U.S. PATENT DOCUMENTS

| | | |
|---|---|---|
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 * | 11/2005 | Cattan et al. ................ 370/352 |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,962,644 B1 | 6/2011 | Ezerzer et al. |
| 8,126,128 B1 | 2/2012 | Hicks et al. |
| 2002/0006124 A1 | 1/2002 | Jimenez et al. |
| 2002/0077833 A1 | 6/2002 | Arons et al. |
| 2002/0126813 A1 | 9/2002 | Partovi et al. |
| 2003/0026426 A1 | 2/2003 | Wright et al. |
| 2003/0046366 A1 * | 3/2003 | Pardikar et al. ................ 709/219 |
| 2003/0059020 A1 | 3/2003 | Meyerson et al. |
| 2003/0061404 A1 * | 3/2003 | Atwal et al. ................ 709/328 |
| 2004/0101122 A1 | 5/2004 | Da Palma et al. |
| 2004/0172482 A1 | 9/2004 | Weissman et al. |
| 2004/0213400 A1 | 10/2004 | Golitsin et al. |
| 2005/0240659 A1 | 10/2005 | Taylor |
| 2005/0246176 A1 * | 11/2005 | Creamer et al. ............ 704/270.1 |
| 2006/0015467 A1 | 1/2006 | Morken et al. |
| 2006/0143007 A1 | 6/2006 | Koh et al. |
| 2006/0203979 A1 | 9/2006 | Jennings |
| 2006/0215824 A1 | 9/2006 | Mitby et al. |
| 2006/0217978 A1 | 9/2006 | Mitby et al. |
| 2006/0262915 A1 | 11/2006 | Marascio et al. |
| 2007/0002744 A1 | 1/2007 | Mewhinney et al. |
| 2007/0036143 A1 | 2/2007 | Alt et al. |
| 2007/0070906 A1 | 3/2007 | Thakur |
| 2007/0070980 A1 | 3/2007 | Phelps et al. |
| 2007/0121651 A1 | 5/2007 | Casey et al. |
| 2007/0127703 A1 | 6/2007 | Siminoff |
| 2007/0133771 A1 | 6/2007 | Stifelman et al. |
| 2007/0192629 A1 | 8/2007 | Saito |
| 2007/0242626 A1 | 10/2007 | Altberg et al. |
| 2007/0265073 A1 | 11/2007 | Novi et al. |
| 2007/0291905 A1 | 12/2007 | Halliday et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0165708 A1 | 7/2008 | Moore et al. |
| 2008/0232574 A1 | 9/2008 | Baluja et al. |
| 2008/0313318 A1 * | 12/2008 | Vermeulen et al. ............ 709/223 |
| 2008/0317222 A1 | 12/2008 | Griggs et al. |
| 2009/0052437 A1 | 2/2009 | Taylor |
| 2009/0052641 A1 | 2/2009 | Taylor |
| 2009/0074159 A1 | 3/2009 | Goldfarb et al. |
| 2009/0089699 A1 | 4/2009 | Saha et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0252159 A1 | 10/2009 | Lawson et al. |
| 2010/0037204 A1 | 2/2010 | Lin et al. |
| 2010/0142516 A1 | 6/2010 | Lawson et al. |
| 2010/0150139 A1 | 6/2010 | Lawson et al. |
| 2010/0232594 A1 | 9/2010 | Lawson et al. |
| 2010/0235539 A1 | 9/2010 | Carter et al. |
| 2011/0081008 A1 | 4/2011 | Lawson et al. |
| 2011/0083179 A1 | 4/2011 | Lawson et al. |
| 2011/0176537 A1 | 7/2011 | Lawson et al. |
| 2011/0280390 A1 | 11/2011 | Lawson et al. |
| 2011/0283259 A1 | 11/2011 | Lawson et al. |
| 2011/0320550 A1 | 12/2011 | Lawson et al. |

FOREIGN PATENT DOCUMENTS

| | | |
|---|---|---|
| EP | 0282126 A | 9/1988 |
| EP | 1464418 A | 10/2004 |
| ES | 2134107 A | 9/1999 |
| WO | 02087804 | 11/2002 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

* cited by examiner

```
GET /foo.php HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIG. 4A

```
POST /foo.php HTTP/1.1
Host: demo.twilio.com
Content-Type: application/x-www-form-urlencoded
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 11

Digits=1234
```

FIG. 4B

```
GET /foo.php?digits=1234 HTTP/1.1
Host: demo.twilio.com
X-Twilio-CallGuid=DE870AD708ED70AE87D0AE7DAD7
X-Twilio-CallerId=415-555-1212
X-Twilio-NumberCalled=415-867-5309
X-Twilio-AccountId=AAF4AF5AF8A9A885449F7A647AF84
Content-Length: 0
```

FIG. 4C

```
GET /foo.php HTTP/1.1
Host: demo.twilio.com
X-Twilio-SMSid=DE870AD708ED70AE87D0AE7DAD7
X-Twilio-SMSSenderID=415-555-1212
X-Twilio-SMSShortCode=11111
X-Twilio-AccountId=AAF4AF5AF8A9A885449F7A647AF84
Content-Length: 0
```

FIG. 4D

```
GET /foo.php HTTP/1.1
Host: demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length: 21

Message=statusrequest
```

FIG. 4E

```
GET /foo.php?message=statusrequest HTTP/1.1
Host: demo.twilio.com
X-Twilio-SMSid=DE870AD708ED70AE87D0AE7DAD7
X-Twilio-SMSSenderId=415-555-1212
X-Twilio-SMSShortCode=11111
X-Twilio-AccountId=AAF4AF5AF8A9A885449F7A647AF84
Content-Length: 0
```

FIG. 4F

```
XML Response

<?xml version="1.0" encoding="UTF-8"?>
<Response>
        <Collect
                successUrl="http://www.example.com/phonetree.php"
                numDigits="1"
                timeout=20
        >
                <Say voice="female">
For sales press one. For support press two. For the operator, press three.
                </Say>
        </Collect>
</Response>
```

FIG. 5A

```
XML Response

<?xml version="1.0" encoding="UTF-8"?>
<Response>
        <sms address=415-555-555
                thanks for the your text, will call at 5 PM.
        </sms>
        <CallAtTime="17:00PST">
                Today
                <Dial>415-555-5309</Dial>

</CallAtTime>
</Response>
```

FIG. 5B

```
POST /2008-08-01/Accounts/AC309475e5fede1b49e100272a8640f438/Calls HTTP/1.1
     Caller=4155555309&Called=4155551212&Url=http://www.myapp.com/myhandler.php <TwilioResponse>
     <Call>
          <Sid>CA42ed11f93dc08b952027ffbc406d0868</Sid>
          <CallSegmentSid/>
          <AccountSid>AC309475e5fede1b49e100272a8640f438</AccountSid>
          <Called>4155551212</Called>
          <Caller>4155555309</Caller>
          <PhoneNumberSid>PN0123456789012345678900<PhoneNumberSid>
          <Status>0</Status>
          <StartTime>Thu, 03 Apr 2008 04:36:33 -0400</StartTime>
          <EndTime/>
          <Price/>
          <Flags>1</Flags>
     </Call>
</TwilioResponse>
```

FIG. 6

SYSTEM AND METHOD FOR PROCESSING TELEPHONY SESSIONS

CROSS-REFERENCE TO RELATED APPLICATIONS

This application claims the benefit of the following: U.S. Provisional Application No. 61/041,829 filed 2 Apr. 2008 and entitled "System and Method for Processing Telephony Sessions"; U.S. Provisional Application No. 61/055,417 filed on 22 May 2008 and entitled "System and Method for Processing SMS Messages", U.S. Provisional Application No. 61/100,578 filed on 26 Sep. 2008 and entitled "System and Method for Processing Telephony Sessions", U.S. Provisional Application No. 61/156,746 filed on 2 Mar. 2009 and entitled "System and Method for Processing Telephone Sessions", and U.S. Provisional Application No. 61/156,751 filed on 2 Mar. 2009 and entitled "System and Method for Processing Telephony Sessions", which are all incorporated in their entirety by this reference.

TECHNICAL FIELD

This invention relates generally to the telephony field, and more specifically to a new and useful system and method for processing telephony sessions in the telephony field.

BACKGROUND

In the last decade, legislation and the advent of Voice over Internet Protocol (VoIP) have revolutionized the communication industry with new technologies, business models, and service providers. Software and commodity hardware now provide an alternative to expensive carrier equipment. One can implement extensible call switching and voice application logic in Open source software applications, such as Asterisk and FreeSwitch. These new application stacks, however, usher in new complexities and challenges, requiring new skill sets to deploy, develop, and maintain. Deploying telephony services requires knowledge of voice networking and codecs, hardware or services to bridge servers to the public phone infrastructure, capital investment in hardware, and ongoing collocation of that hardware. These burdens are a mere prerequisite to developing the actual application, which requires developers to train in new languages, tools, and development environments. Even telephony applications that currently try to leverage a model more similar to web-development such as Voice Extensible Markup Language (VoiceXML), require the dedication to learn a new language and understand telephony interaction. Ongoing operation and maintenance of these services requires teams to adopt new analysis tools, performance metrics, and debugging methodologies. Developing even the simplest of voice services (such as a so-called "phone tree") requires significant upfront and ongoing investment in specialized infrastructure, skills, and operations. Thus, there is a need in the telephony field to create a new and useful system and method for processing telephony sessions. This invention provides such a new and useful system and method.

SUMMARY

The method of the preferred embodiment for processing telephony sessions include the steps of communicating with an application server using an application layer protocol, processing telephony instructions with a call router, and creating call router resources accessible through an Application Programming Interface (API). The method and system of the preferred embodiments enables web developers to use their existing skills and tools with the esoteric world of telephony, making telephony application development as easy as web programming. The method and system use the familiar web site visitor model to interact with a web developer's application, with each step of the phone call analogous to a traditional page view. Within this model, developers reuse their existing tools and techniques, including familiar concepts such as HTTP redirects, accessing resources through an API, cookies, and mime-type responses to construct complex telephony applications. The method of processing telephony instructions and creating call router resources accessible through an API (a call router API) cooperatively function to enable a stateless and simple telephony language with more call router resources and information provided through the call router (preferably a REST API as is familiar to many web developers). In one embodiment, the telephony instructions set may have fewer than dozen verbs, simplifying the language so that developers can quickly learn and implement telephony applications, while the call router API compliments the simple telephony instructions to enable complex telephony applications.

BRIEF DESCRIPTION OF THE FIGURES

FIGS. 4A-4C are examples of a HTTP GET request, a HTTP POST request, and a HTTP GET request, respectively.

FIGS. 4D-4F are examples of a HTTP requests.

FIGS. 5A and 5B are examples of XML responses.

FIG. 6 is an example of a call Router request and response.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Processing Telephony Sessions

As shown in FIGS. 1, 2A, 2B, 3A, and 3B, the method 10 of the preferred embodiment for processing telephony sessions include the steps of communicating with an application server using an application layer protocol S110, processing telephony instructions with a call router S120, and creating call router resources accessible through an Application Programming Interface (API) S110. The preferred method may also include other steps and/or sub-steps, as explained below.

1A. Communicating with an Application Server

Figure 1:
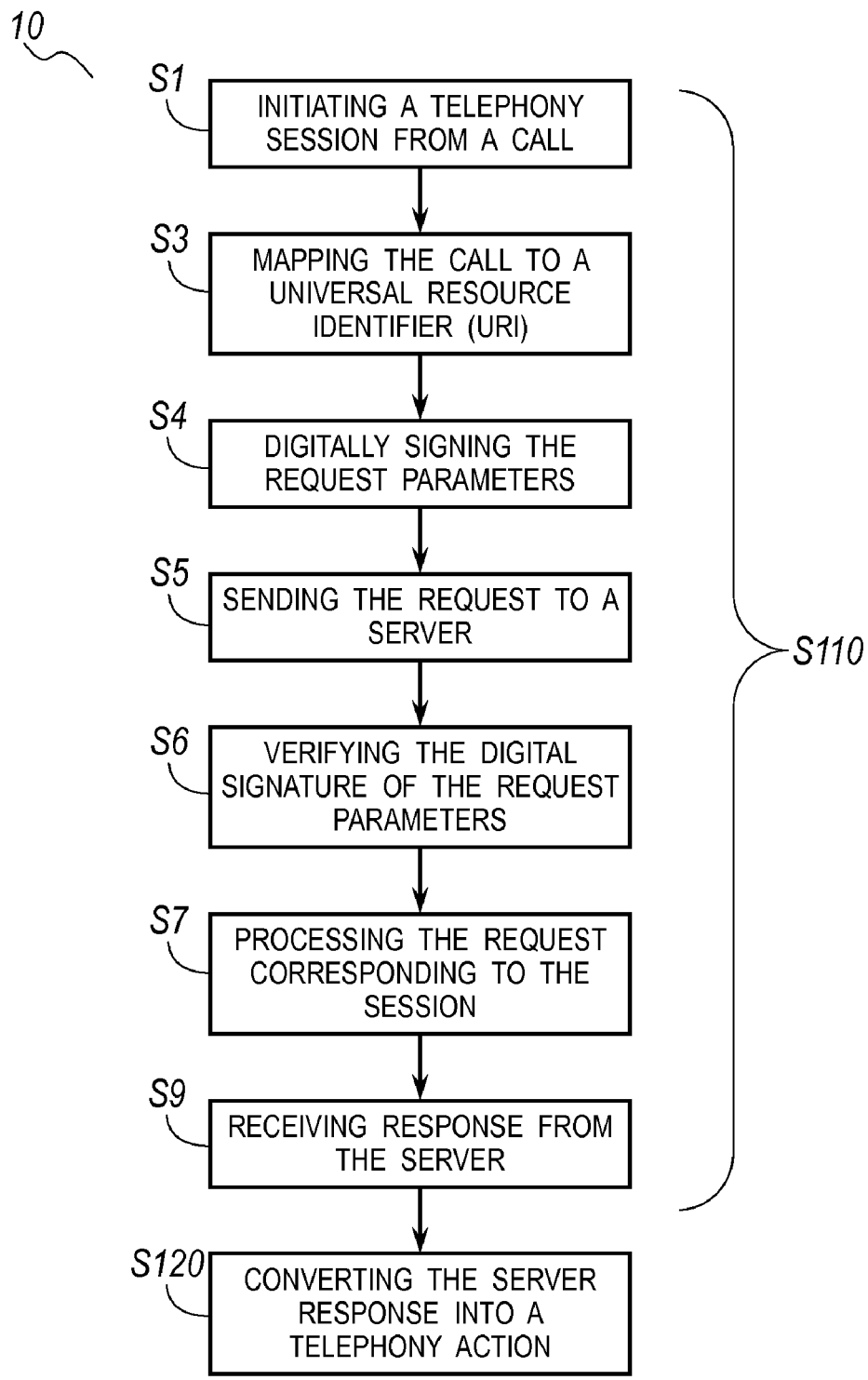
FIG. 1 is a flowchart representation of a preferred method of the invention.

As shown in FIG. 1, the step of communicating with an application server using an application layer protocol S110 preferably includes the following sub-steps: initiating a telephony session S1, mapping a call to a Universal Resource Identifier (URI) S3, sending a request to a server associated with the URI S5, processing the request corresponding to the state of a telephony session S7, and receiving a response from the server S9. One of the challenges of using the familiar web site visitor model is that a third party web application may expose URIs that contain sensitive data or that suggest actions that could maliciously manipulate the application database. In the preferred embodiment, the call router cryptographically signs outbound requests to customer web applications using an account-specific key. More specifically, the step of communicating with the application server includes the additional steps of digitally signing the request parameters S4 and verifying the digital signature of the request parameters S6. Only the call router and the application server know that key, so any request that includes parameters (URL, POST data, headers, etc) signed with that key can be checked for authenticity before allowing such operations. This method also provides verification of authenticity over insecure links (HTTP) with low CPU overhead.

Step S1, which recites initiating a telephony session, functions to accept an incoming message. The message is preferably a call from a PSTN-connected (Public Switched Telephone Network) or Internet addressable devices, such as landline phones, cellular phones, satellite phones, Voice-Over-Internet-Protocol (VoIP) phones, SIP devices, Skype, Gtalk, or any other suitable PSTN-connected or Internet addressable voice device. The message may alternatively be a Short Message Service (SMS) message. A SMS gateway server may alternatively connect to a SMS network through a Short Message Service Center ("SMS-C"), directly to the Signaling System #7 (SS7) telephony network, or by any other suitable SMS gateway provider, and the message is preferably received from the gateway by the call router and translated into a format (such as a URI) that can be sent over the public Internet such as HTTP, based on the recipient address of the SMS, such as a short code, or Direct Inward Dialing (DID), or other suitable unique recipient identifier. The message may alternatively be a multimedia message, a facsimile transmission, an email, or any other suitable messaging medium. The originating phone number of the PSTN device is preferably captured using caller ID, but any other suitable ID may be captured, such as a VoIP provider ID, SMS device number, email address, or a short code. The dialed phone number, the EIN, and/or billing identifier, and/or the date and time of the call are also preferably included in the session information. An authentication ID may additionally or alternatively be included in the session information.

In one variation, Step S1 also functions to initiate a telephony session (such as a phone call) via an HTTP or other request sent to a call router from an application running on a third-party server. In this variation, the application running on the server preferably specifies an initial URI for the call router to use for telephony session in step S3, as well as the phone number (or other addressable destination) to dial and the source phone number (caller id). In this variation, the call router API is preferably used by the application server to request an outgoing call from the call router.

Step S3, which recites mapping the call to a Universal Resource Identifier (URI), functions to enable a telephony session to be converted into a format that may be handled with standard web servers and web applications. The mapping is preferably performed using a call router. The initial URI is preferably pre-specified at the call router by a web application (which may be running on a third party server) or call router account owner. More preferably, the initial URI is assigned to the call via a unique identifier for the call destination, such as a DID (Direct Inbound Dial) phone number, or a VoIP SIP address. The URI may alternatively be specified by a remote server or other suitable device or method. In one variation, the URI may be used to encapsulate state information or a portion of state information from the initiated telephony session, such as the originating phone number, the dialed phone number, the date and time of the call, geographic location of the caller (e.g. country, city, state, and/or zip), and/or the unique call ID. The information included in the URI may be included in the form of a URI template. For example the URI default template could be: http://demo.twilio.com/myapp/{dialed phone number}/{originating phone number} or http://demo.twilio.com/myapp/foo.php?dialed_number={dialed phone number}&originating_number={originating phone number}.

Figure 16:
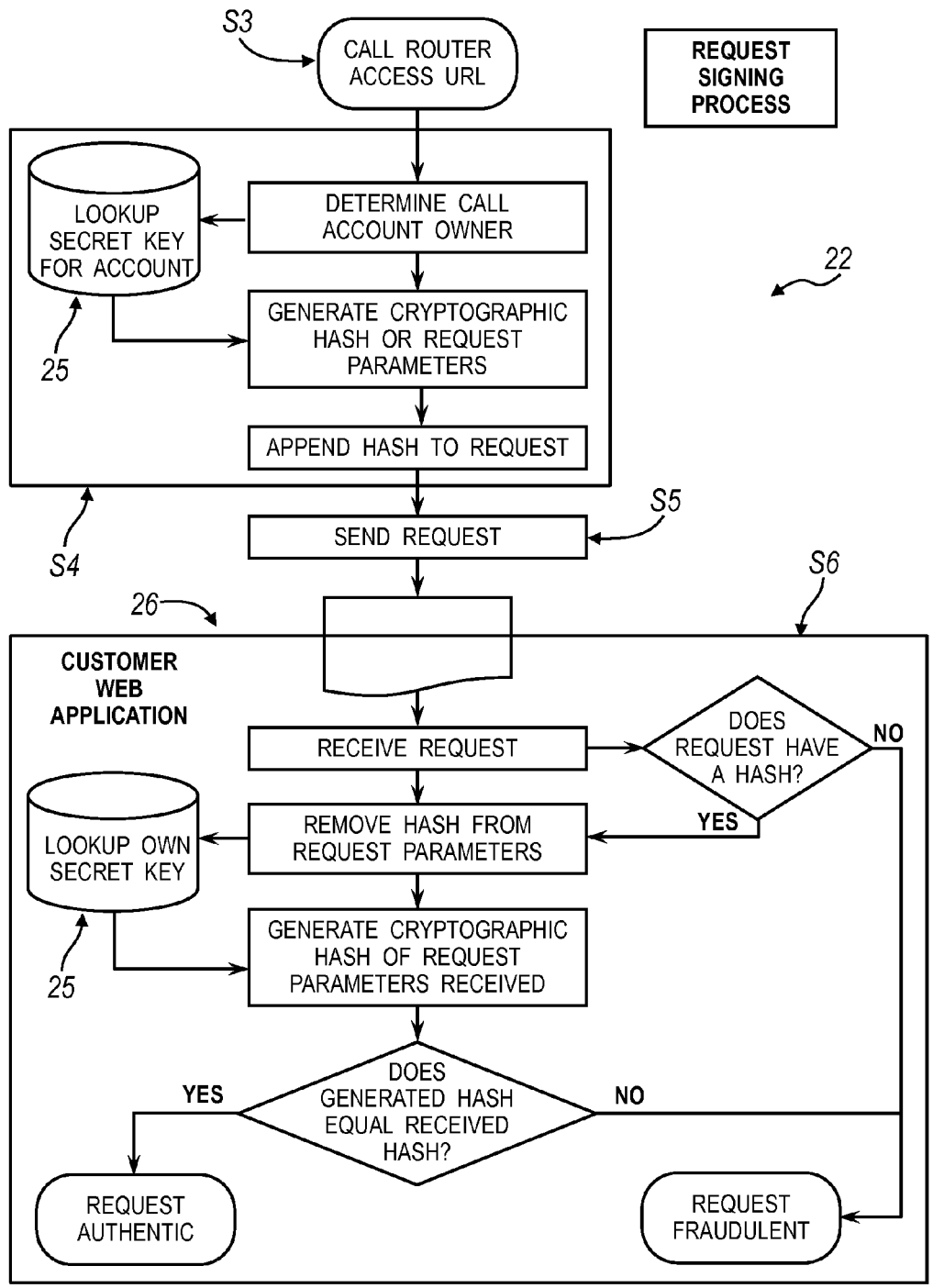
FIG. 16 is a flowchart representation of the sub-steps relating to the digital signature aspect of the preferred method of the invention.

Step S4 functions to digitally sign the request parameters. As shown in FIG. 16, Step S4 preferably determines the call router account owner and, more preferably, looks up the account owner's unique ID or secret key and signs a set of request parameters. Step S4 is preferably accomplished by generating a cryptographic hash of the request parameters, preferably including the URI as well as any request body parameters (in the case of an HTTP POST, for example) with the unique key associated with the call router account owner. The cryptographic hash is preferably generated by appending the hash of the request parameters to the original set of request parameters. The hash is preferably appended to a URL, but if the hash is particularly long (i.e. for a very large number of parameters) the hash may be included in an HTTP header, where there is no limitation on size. In a variation of Step S4, at least one sensitive parameter may be individually encrypted using the account owner's secret key before the hash is processed. In another variation, a cryptographic credential delegation system, such as Oauth (oauth.net), may alternatively be used to electronically sign the request.

Step S5 functions to send the request to a server. Preferably, the request is sent to a URI and, more preferably, the request is sent to the URI mapped in S3. The request preferably includes a cryptographic hash computed from the set of request parameters (acting as a digital signature), but the request may alternatively include individually encrypted request parameters if the parameters are determined to contain sensitive data. The server is preferably a third party server and, more preferably, the server is running a web application. The request is preferably sent to a server over a network. In one variation, the request is sent to a local server on a local area network. In another variation, the request is sent to a server running locally on the device originating the call. In yet another variation, the request may be sent to multiple servers. The request preferably encapsulates at least a portion of the state information from the initiated telephony session, such as the originating phone number, the dialed phone number, the date and time of the call, geographic location of the caller (e.g. country, city, and/or state, zip), and/or the unique call ID. The request, more preferably, encapsulates all the state information of the call, but may alternatively include no state information or partial state information. The state information from the initiated telephony session is preferably sent via HTTP POST in the request body, HTTP GET in the request URI, HTTP header parameters to mimic the data flow of a web browser, or by any combination or suitable alternative way. If new state information is generated in the course of the operation of the call router, a request to the application server is preferably made to communicate the new state and to request new telephony instructions. Preferably, new state information is not kept or acted upon internally by the call router, but is passed to the application server for processing. Alternatively, partial state information is preferably stored on the call router until a fully updated state is achieved, and then communicated to the application server. For example, the application server may specify that multiple digits should be pressed on the keypad, not just one, before new call state is derived and communicated to the application server. In one variation, the information from the initiated telephone session may be a web-form submission included in the HTTP POST request. The request may include any state information from the telephony session, such as the originating phone number, the dialed phone number, the date and time of the call, and/or the unique call ID, the current status of the phone call (pending, in-progress, completed, etc.), or the results of a telephony action, including Dual Tone Multi Frequency (DTMF) digit processing, or a representation of or a link to a sound recording, or the status of the last command, or other call state. Examples of a HTTP GET request, a HTTP POST request, and a HTTP GET request are shown in FIGS. 4A, 4B, and 4C, respectively. Further examples of HTTP communication used for SMS messaging are shown in FIGS. 4D, 4E, and 4F. The HTTP request (or any suitable request communication) to the server preferably observes the principles of a RESTful design. RESTful is understood in this document to describe a Representational State Transfer architecture as is known in the art. The RESTful HTTP requests are preferably stateless, thus each message communicated from the call router to the application server preferably contains all necessary information for operation of the application server and response generation of the application server. The call router and/or the application server preferably do not need to remember or store previous communications to be aware of the state. Documents, media, and application state are preferably viewed as addressable resources, combined with data provide to the resource via request parameter, such as HTTP GET or HTTP POST parameters, or request body contents. Such request data may include an updated representation of the call resource, or other call state data generated as a result of call router operation, such as digits pressed on the keypad or audio recordings generated. State information included with each request may include a unique call identifier, call status data such as whether the call is in-progress or completed, the caller ID of the caller, the phone number called, geographic data about the callers, and/or any suitable data. However, a varying level of a RESTful communication (statelessness) may be used, such as by using cookies, session tracking, or any suitable devices to simulate a normal website visitor model. Preferably, data sent with each request may fully enable the application server to determine the next state of the call to execute. RESTfulness preferably does not preclude using external datasource, such as a database, to lookup additional data to log call meta data, or determine application logic.

Figure 13:
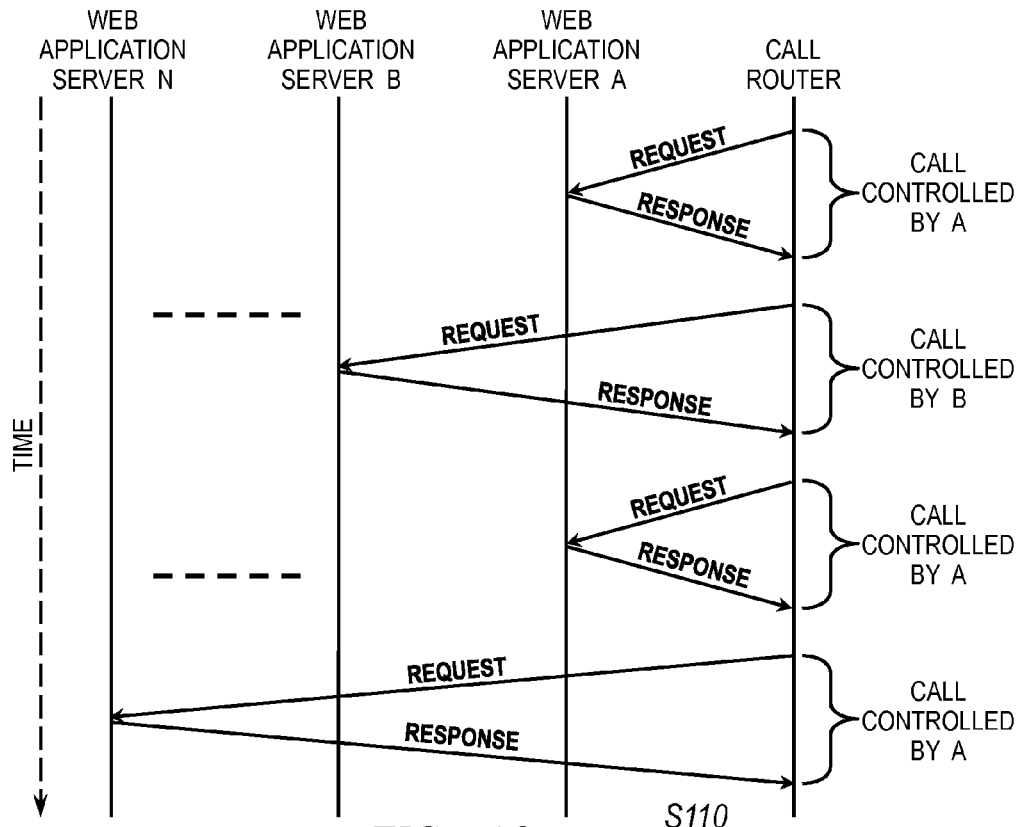

Step S6 functions to verify the digital signature of the request parameters. As shown in FIG. 13, after the request is received at the server, the request parameters are preferably checked and/or parsed for a hash. The cryptographic hash is preferably included in the URL of an HTTP request, but may alternatively be included in the HTTP header of the request. If the request does not include a hash, and the web application server has enabled the hash function checking as a security measure, the request is preferably determined to be fraudulent, which would include—for example—malicious requests, mis-routed requests, corrupted requests and any other requests not intended for the application server. If the set of request parameters includes a hash, the hash is preferably extracted from the request, and the secret key of the customer web application (i.e. the same key that is stored on the call router as the customer account secret key) is preferably used to generate a server side cryptographic hash of the parameters received. The server side cryptographic hash is preferably compared to the hash included with the request and if the hashes do not match, the request is preferably determined to be fraudulent. However, if the server side cryptographic hash matches the request hash, the request is preferably determined to be authentic and ready for further processing at the application server. In the variation mentioned above in Step S4, where sensitive parameters may have been encrypted using the secret key, Step S6 preferably includes decrypting the sensitive parameters. The application server and the third parties operating the application are preferably responsible for completing this verification step, but the verification may alternatively be completed by a single party, such as when a single party operates the application server and the call router. The application server may alternatively be configured to ignore a hash included with the request parameters if request authentication is not important to the application.

Step S7, which recites processing the request corresponding to the state of a telephony session, functions to perform processing functions on at least a portion of the data included in the request. The processing functions are preferably performed on a third party server. The processing functions may include recording the data included in the request and/or metadata about the call session, routing to another URI, performing a database lookup of at least one portion of the data included in the request, voice recognition processing, or any other suitable processing function. The processing functions may re-use logic and data from other business applications, such as customer databases and/or shopping cart applications, which may be linked using caller-id or caller provided information. State information is preferably communicated with each request from the call router, and application state is preferably not required on the application server. Alternatively, the application server may store state between each request related to the call, by using HTTP cookies, sessions, and/or database records. In some cases, such as the case of a static HTML page running on a server or a stored media file such as an mp3 or wav file stored on a server, Step S7 may be simplified, and a file mapped to disk by the URI may be simply returned.

Step S9 recites receiving a response from the server. This response is preferably an HTTP response. The response is preferably sent as XML, audio binary, or raw text, but may alternatively be any sort of messaging format, including HTML, delimited text, key/value text or binary encoded format. The HTTP response preferably includes directions to perform telephony actions. The response may alternatively or additionally include a new URI or a new URI template to use with the telephony action in Step S3. An additional example XML response is shown in FIGS. 5A and 5B.

1B. Processing Telephone Instructions

The step of processing telephone instructions with a call router S120 preferably functions to convert the server response into telephony actions or executable operations during a telephony session. The telephony actions may include, for example, playing a pre-recorded sound file at a server-specified URI (such as a static mp3 file located at http://demo.twilio.com/myapp/1234.mp3), reading text to the caller using text-to-speech technology, calling another number (such as creating a new voice connection through the PSTN, SIP/VoIP, or other IP technology system), collecting digits via DTMF input, recording voice response audio, TTY or other inputs, sending an SMS message, or any suitable combination or sequence of these or other suitable actions. This conversion of the server response is preferably performed at a call router. Preferably, Step S120 includes processing the response mime-types associated with the server response. For example, if the response mime-type is XML, it is considered to be a set of call router instructions. If the response mime-type is MP3, it is considered a sound file to be played for the caller. If the response type is plain text, it is considered to be text to be read, via Text-To-Speech, to the caller.

Figure 14:
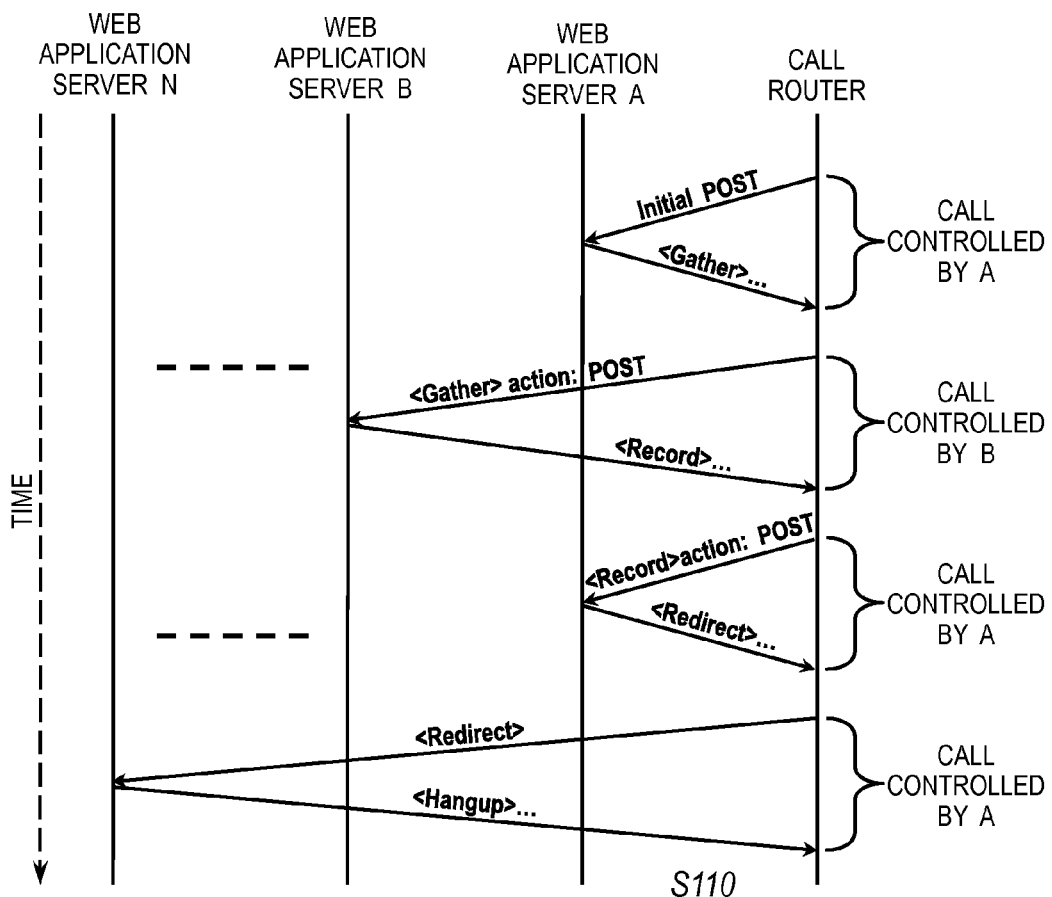

Contents of the server response, such as an XML document, are preferably converted into a telephony action by processing the document sequentially (e.g. line by line). Telephony instructions are preferably contained within the document in the form of a markup language, such as XML as shown in FIGS. 5A and 5B. This sequential approach to processing a document of telephony instructions is enabled when the communication is stateless and all the necessary information is contained within the URI. This stateless communication preferably allows telephony instructions (verbs or commands) to be used as the programming interface for a server application performing telephony services. Algorithmic interpretation (based on the state of the communication) of the telephony verbs or the document is preferably not necessary. The telephony actions are preferably executed in the order of telephony instructions found in the contents of the server response. For example, an XML document may include the necessary verbs to carry out the telephony actions of reading text to a caller, monitoring keys pressed by the caller, and redirecting the caller to a new URI using the pressed keys as part of the data within the new URI. Preferably, the telephony action (such as digits pressed) results in new state information, which may result in a repetition of some steps of the method, preferably beginning at Steps S3. The next URI is preferably provided by the server as part of the processing instructions. In another variation, the last URI is reused if the server fails to specify a next URI. In yet another variation, no repetition occurs if the server fails to specify a next URI, and processing continues below at the next call router instruction. The behavior may be determined by the nature of the call router instruction; for example, instructions that generate no new state information would not need to have a next URI since they don't trigger communication with a remote server. More preferably, the telephony actions result in the repetition of step S3 with the new URI resulting from Step S11, but may alternatively initiate a repetition of one or more steps (Steps S5, S7, S9, or S11) of the method. Step S3 is preferably repeated using all new phone session state information resulting from execution of a telephony action, such as digits pressed, a recorded audio file, or the success or failure of any telephony action requested. Repetition also includes all state information that remains relevant during the course of the session, such as Caller, Called, unique Call ID, and call status. The state information may also be represented in the form of a URI Template. For example, if the server response specifies that the call router should collect DTMF digits, and specifies that the next URL is the URI Template http://demo.twilio.com/foo.php?digits={Digits}, and the caller presses 1234, the resulting URI is http://demo.twilio.com/foo.php?digits=1234. Similarly, if the server response specifies the URI Template: http://demo.twilio.com/myapp/{Digits}.mp3, the resulting HTTP Request could be to a static mp3 file located at: http://demo.twilio.com/myapp/1234.mp3. Thus, a call may be controlled by one server that issued the telephony instruction and a second server that processes the response, as shown in FIGS. 13 and 14. Such call control hand-offs constitute the transfer of state information between servers in the form of a URI and accompanying request data, such as GET, POST, and/or request body. Preferably, all state communications conform to a syntax established by the call router to facilitate integration between multiple servers. For example, digits pressed on the keypad are preferably communicated to application servers in an identical fashion, thus minimizing the need for coordination between a multiple application servers with regard to how state is transferred. Alternatively, call router instructions may dictate the method of communicating new state information, such as the names and types of variables to send representing new state.

1C. Creating Resources Accessible by a Call Router API

The step of creating call router resources accessible through an Application Programming Interface (API) S130 preferably functions to expose information and/or functionality of the call router. The interaction from outside parties is preferably performed via the API (call router API). The Call Router API may additionally cooperate with the use of telephony instructions to function as a storage and retrieval format for data generated or required by the call router's operation. The Call Router API is preferably an application programming interface (API) such as a REST API (Representational State Transfer) as is known in the art, but the Call Router API may alternatively be a SOAP (Simple Object Access Protocol) API or any suitable programmatic communication interface. The Call Router API preferably may be used by an application asynchronously to the execution of a call (such as to later query the call records or retrieve recordings). Alternatively, the Call Router API may be used synchronously during the course of a call (such as to alter the state of the call, hanging up a call, initiating call recording, etc.). The Call Router API preferably stores state information in a persistent URI for a resource. The persistent URI preferably contains all the necessary state information, and this preferably makes data persistent, queryable, and recoverable. The Call Router API is preferably used for modifying resources to alter state of call router and for interacting with media of the call router. An application server can use the Call Router API to preferably query meta-data of call records, caller identification, call media (such as recordings, text transcripts, etc.), account information, transfer or interact with in-progress communications in the call router, and/or any suitable data generated by or required to operate the call router. The Call Router API preferably involves communication between an application server and a call router, but may alternatively be communication from any suitable device to the call router. The Call Router API preferably resides on the same hardware as the call router, but may alternatively reside on remote hardware or on any suitable hardware environment. The communication is preferably HTTP, but alternatively HTTPS or any suitable communication protocol may be used. The Call Router API may additionally be compatible with any HTTP client. The telephony system of the preferred embodiment preferably implements a Call Router API that includes a Call Router API request format, a Call Router API response format, and a plurality of API Resources representing types of data generated by or used by the Call Router.

The Call Router API request of the preferred embodiment functions as a communication message sent from an application server to an API resource of the call router. The Call Router API request is preferably sent from an application server to a call router, but may be sent from any suitable device to the call router. The Call Router API request is preferably similar to a REST API request, but the Call Router API request may alternatively conform to any suitable programming principle, such as SOAP. The Call Router API request preferably uses HTTP to interface with a resource, but HTTPS or any suitable communication protocol may be used. Preferably the HTTP or HTTPS method of GET is used to retrieve a resource or resource information, and the HTTP or HTTPS method of PUT or POST is used to create or update a resource. In some cases, PUT or POST may be used to affect the functionality of the call router by modifying the state of a resource. Alternatively, a method parameter may be included in the URI of the resource to identify a requested action for the resource, or any suitable commands or methods may be used to interface with an API resource. The Call Router API request preferably includes authentication such as basic HTTP or HTTPS authentication, by including message authentication information in the URI, such as a cryptographic hashing of the request content using a shared key, or by any suitable method.

The Call Router API response of the preferred embodiment functions as a communication sent in response to a method performed on an API resource. The Call Router API response is preferably sent from the call router to an application server, or any suitable device. The Call Router API response is preferably sent in response to a Call Router API request, and the response is preferably sent to the originating device. The Call Router API response is preferably similar to a REST API response, where the response is a representation of the requested resource. The Call Router API response may alternatively conform to any suitable programming principle such as SOAP. The Call Router API response is preferably returned as formatted XML with information corresponding to the HTTP status code, a message, error codes, and/or any suitable information related to the resource. The Call router API response may alternatively be represented as Comma-separated values list (CSVs), HTML, JSON, or any suitable format. In one variation, the response format is determined by a portion of the requested URI, such as a file extension. In one variation, an API resource may be a binary data resource, and the Call Router API response is preferably formatted in a native binary format (e.g., a wav or mp3 audio file), an XML meta-data description, and or any suitable format.

The API resource of the preferred embodiment functions as an addressable representation of call router meta-data, internal call router state, or the state of a given resource used by the call router. An API resource is preferably addressed by a persistent URI. Preferably, the API resource responds to at least one HTTP action of POST, PUT, GET, or DELETE. The API resource may alternatively respond to multiple HTTP actions. The API resource may alternatively respond to any suitable method(s) that are preferably included in the Call Router API request. Consistent with the RESTful conventions, a GET request of a resource may return the current state of a resource, while PUT may update the state, PUT or POST may be used to create a new resource, and DELETE may be used to destroy a resource. The call router API may alternatively be used to affect the functionality of an in-progress call in addition to modifying data. The API resources of the preferred embodiment include an account resource, caller ID resource, incoming address resource, call resource, media resource, and/or any suitable resource of the call router. The API resources may alternatively be any suitable combination of the listed resources or other suitable resources. An API resource is preferably a preconfigured (or "static") resource, such as account information, or a resource actively in use by the call router, such as a phone call. Modifying the state of a resource via the API may additionally affect the operation of the call router in real-time, affect the state or capabilities of the call router in the future, and/or have any suitable effect.

The account resource of the preferred embodiment functions to allow an application to retrieve and/or modify account information. An account is preferably created by a telephony service provider, such as the operator of the call router. Information such as account name, usage information, contact information, initial URI, setup parameters, or any suitable account information may be retrieved or edited by an application using the account resource.

The caller ID resource of the preferred embodiment functions to allow an application to retrieve, modify, register new caller ID's (phone numbers), and/or delete caller identification information. The caller identification information is preferably for the phone number associated with out-going calls made by an application and/or user (i.e. where the application appears to be calling from). The numbers for outgoing calls are preferably assigned or verified prior to being used as a caller ID. As an alternative, to prevent fraudulent use of caller ID phone numbers in applications, a verification step may be used by the API before adding a new caller ID resource. A request to add a caller ID may be initiated via a request to the API, wherein a random validation code is generated and returned in the API response. The validation code is preferably provided to an end user. A phone call is placed to the given phone number (caller ID), requesting that the validation code be entered via keypad digits or spoken. Entry of the validation code verifies possession of the phone number, or the device associated with the phone number, at the time of the request. Use of the caller ID resource may additionally be presented in a user interface, such as a web browser, by displaying the verification code. User interface may be provided by the operator of the call router, or may be provided by any suitable application using the API. Any suitable method may also be used for verification of a caller ID. In another alternative, where multiple parties are involved in a call, the caller ID of one of the existing party members may be assigned for additional outgoing calls during that call session.

The incoming address resource of the preferred embodiment functions to allow an application to get, modify, or provision new inbound DID phone numbers, SMS short codes, SIP Addresses, etc. for use with applications. PUT or POST may be used to set the initial URI associated with the inbound address. DELETE may be used to release the resource. The incoming address resource may be used for real-time provisioning of phone numbers or other addressable inbound identifiers.

The call resource of the preferred embodiment functions to allow an application to get or modify the state of a telephony session in the call router. A telephony session or call may be in-progress, completed, failed, not yet initiated, and/or in any suitable call status. A call resource can preferably change the state or connection of an in-progress call. State changes preferably include: hanging up or terminating existing telephony sessions, transferring one or more existing telephony sessions from one contextual group of sessions to another, merging or splitting an existing group telephony sessions, transferring one or more telephony sessions from one communications medium to another (such as from one URI to a second URI), injecting an event or notification into a existing session or group of sessions, recording or ceasing to record the audio from one or more parties on a call, and/or any suitable call action. Call information or call log data can preferably be retrieved by sending a GET to the call resource or by alternatively sending any suitable method. Outgoing calls may also be initiated by using a POST or any suitable method that preferably indicates that a new call resource is to be created. When using the call resource to initiate a call, information may be provided as required to place a phone call, such as a caller ID to present, a phone number to call, and/or a URI to handle the call, but alternatively any suitable information may be provided. A call instruction XML document may alternatively be provided to the API instead of a URI, which is to be used for call instructions. The Call Router API may additionally respond with the status of a call such as if the call is answered, if a machine answered the phone, busy signal, no answer, call failure, and/or any suitable call status. The response may alternatively indicate that the new call request was accepted, but has not yet been initiated. In the example shown in FIG. 6, caller information and caller ID are included in a POST request to the call resource. This step would initiate an outgoing call to the phone number designated in the caller information. The Call Router API response includes available state information regarding the call, such as whether the call has commenced yet, the call start time, end time, price, caller info, and the Call Router API response could alternatively include any suitable information. Additionally, information about the call returned at any point by the API may depend on the status of the call. For example, a call start time would not be given if the call has not yet begun, or the call end time, duration or price would not be given if the call had not yet ended.

Figure 15:
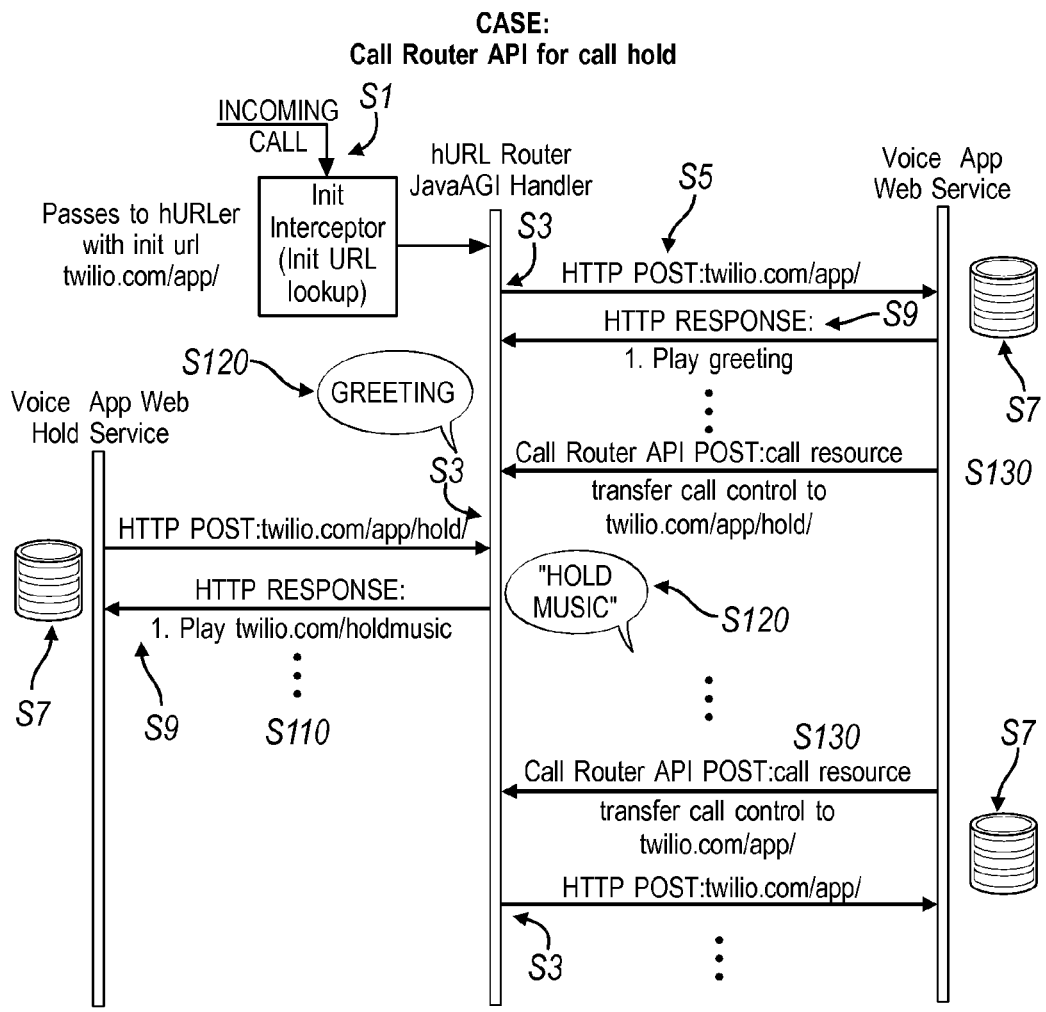

Additionally or alternatively, the call resource of the preferred embodiment may be used to transfer a call to a new URI by a single call resource receiving a POST, PUT, and/or any suitable method. In this alternative, a call is preferably transferred to the new URI for new call instructions. The API may preferably be used to issue asynchronous changes in call state, unlike the synchronous communication between the call router and application server for synchronous URI requests and responses. The call resource, in this alternative, functions to allow a call to be asynchronously directed to URIs. Examples of various applications of the call resource include initiating a new telephony session, terminating an existing telephony session, call waiting, call holding, call queuing, call parking, private call sessions within a conference, carry on multiple call sessions, and/or any suitable application. Any situation where asynchronous events affect the call status, such as a call agent becoming available, or a person returning to the phone after placing a caller on hold. The currently executing call router instruction may be allowed to complete, or may be immediately terminated, before requesting the provided URI. New call state resulting from the last call instruction executed by the call router, such as digits pressed on the keypad or audio recorded from the caller, may be provided to the new URI in a form POST or GET parameters, or may alternatively be discarded by the call router and not provided. As shown in FIG. 15, call waiting may be implemented by an application sending a Call Router API request to the call resource that POSTs a new URI for the call. The caller is then directed to the new URI for instructions. A second Call Router API request is sent to the call resource that POSTs the original URI for the call, and thus brings the caller back to the first call session. The call resource may alternatively be used in any suitable application.

As an alternative embodiment of the call resource, a calls resource may implement a plurality of individual calls as distinct subresources. For example, a URI ending in "/Calls" may be a list of many calls performed by the account, and a URI ending in "/Calls/12345" may represent one specific call, uniquely identified by the key "12345". The calls resource preferably allows retrieval of many call records and/or creating new calls, while a single-call resource represents a single call. The calls resource preferably accepts a request to create a new call resource, as is common in RESTful architectures, which in the Call Router API, preferably serves to initiate one or more new calls. A calls resource may be used to both list current and previous calls using the GET method, as well as initiate a new outbound call using the POST method. Using RESTful principles such as POST or PUT to alter the state of an individual call resource can preferably change the state of an in-progress call, affecting the realtime activities of the call, such as by hanging up, transferring control to a new URI, joining the call with another call, or any suitable telephony action.

The media resource of the preferred embodiment functions to allow an application to retrieve and/or access information of media stored, cached, created, and/or used during a call. In one variation, the media resource is preferably a recording resource to access information and recordings made during a call via recording call instructions, or asynchronously via the Call Router API. In another variation, the media resource may alternatively include call transcripts, text messages, key press logs, faxes, a binary-coded resource, and/or any suitable media. The media resource may alternatively include a URI of the binary-coded file (such as a wav, mp3 audio file or PDF document file). In one variation, the media resources may additionally be integrated with the telephony instructions (or markup language) such that a telephony instruction may instruct the call router to perform an action that creates a media resource. The call router preferably sends a response to the application server with the URI of the created media resource. For example, when the call router is instructed to record a message, the call router preferably sends a response to the application server with a unique URI of the recorded message within the API. The media URI preferably responds to GET requests to return the media in a number of formats, such as binary or XML meta-data representations. The media resource may accept requests to delete a media resource. In one variation, the media resource preferably requires authentication to access the resource. In another variation, the media resource may not require authentication to enable URI embedding in a variety of applications, without exposing authentication credentials. In yet another variation, authentication is preferably performed via cryptographic hashing, such that credentials are not exposed to client applications that consume the media resources. In another variation, the media resource allows the initiation of transcription of audio resources to text using transcription technology. The audio resource used for transcription is preferably generated during telephony sessions (such as by using the record instruction) and hosted on the Call Router API. The media resource preferably allows retrieving or deletion of audio transcriptions generated from recorded media. The media resource may additionally allow centralized hosting of media files, and the resource URIs are preferably exchanged between the call router and the application server, instead of the large media files themselves. The media resource may alternatively be used for any suitable media.

Additionally or alternatively, a join resource of the preferred embodiment may be used to join one or calls into a shared session that allows the parties to communicate (i.e., a conference) by a single call resource receiving a POST, PUT, and/or any suitable method. In this alternative, one or more calls are preferably join together such that they are in a conference. The join resource may alternatively be a subresource or part of the call resource.

Additionally or alternatively, a split resource of the preferred embodiment may be used to split shared sessions (e.g., a conference) into individual call sessions by a single call resource receiving a POST, PUT, and/or any suitable method. In this alternative, one or more shared sessions involving two or more calls are preferably split such that one or more calls are split into separate calls or into on or more separate conferences. The split resource may alternatively be a subresource or part of the call resource.

2. System for Handling Telephony Sessions

Figure 2A:
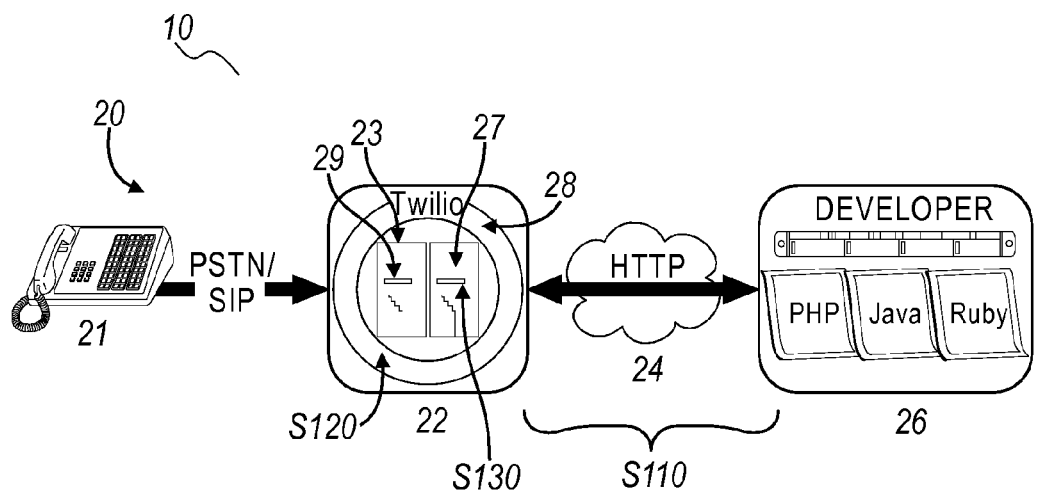
FIGS. 2A, 2B, 3A and 3B are schematic representations of preferred embodiments of the invention.
Figure 2B:
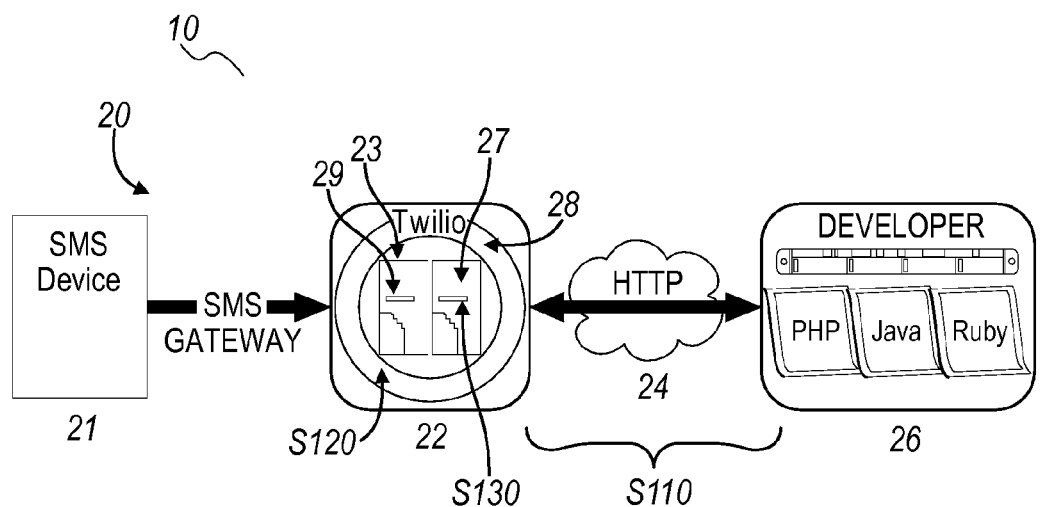
Figure 3A:
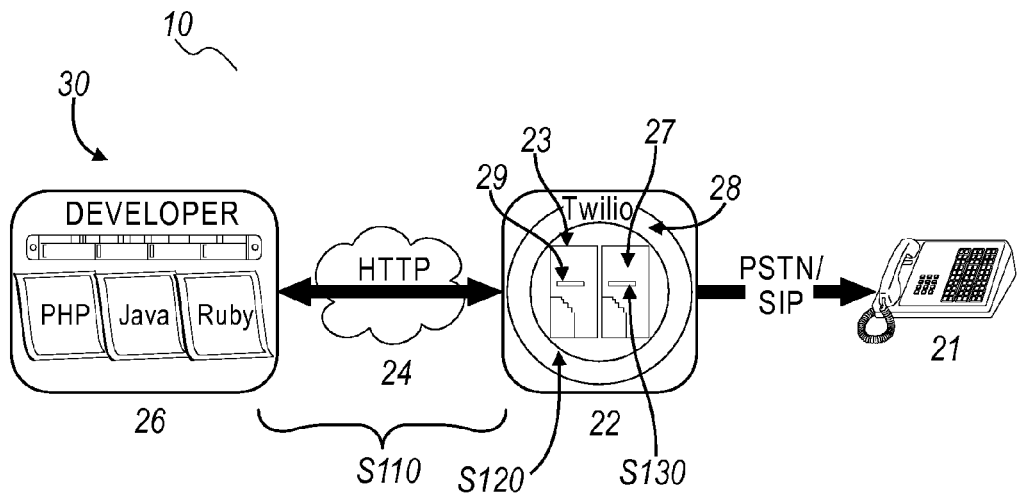
Figure 3B:
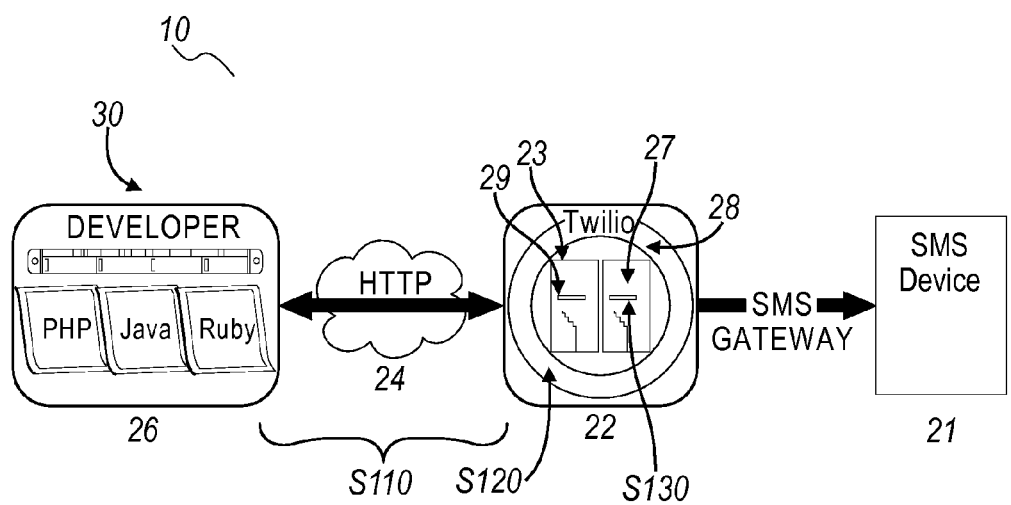

As shown in FIGS. 2A, 2B, 3A, and 3B, a system 20 and 30 of the preferred embodiment for handling telephony sessions includes a call router 22, a URI 23 for an application server, a telephony instruction 27, and a call router resource 29. As shown in FIGS. 2A and 2B, a first configuration 20 is initiated by a telephony device (such as a telephone call, fax or SMS message). As shown in FIGS. 3A and 3B, a second configuration 30 is initiated by an application developer side (i.e., server 26 calling out). The telephony system of the preferred embodiment preferably additionally implements a Call Router API 28 that includes a Call Router API request format, a Call Router API response format and a plurality of resources substantially similar to those described above.

The call router 22 functions to initiate or receive calls from the telephony device and connect to a web-application server. The call router 22 is preferably connected to a PSTN device over the PSTN network, such that it can receive and make calls from PSTN-connected devices 21, such as landlines, cellular phones, satellite phones, or any other suitable PSTN-connected devices, as well as non-PSTN devices, such as Voice-Over-Internet-Protocol (VoIP) phones, SIP devices, Skype, Gtalk, or other Internet addressable voice devices. The call router 22 may alternatively or additionally function as or include a message router for use with SMS messages. The call router 22 can preferably connect to an SMS network, such that it can receive and send messages from SMS network devices 21, cellular phones, computers, smartphones, or any suitable SMS network devices. The call router 22 may also send or receive text messages, multimedia messages, emails, faxes and other suitable PSTN-compatible communication messages. The call router 22 preferably communicates with the application server 26 using an application layer protocol, more preferably using the HTTP, or secure HTTPS, protocol. The communication between the application server 26 and the call router 22 is preferably stateless and any state information (e.g., call state) or data is preferably located in a URI or the request parameters, such as HTTP headers, GET URI parameters, POST request body parameters, or HTTP cookies. Available state information is preferably transmitted by call router requests to the application server for stateless processing, and the application server preferably stores no state. Alternatively, the application server preferably stores local state information, such as databases or sessions, as is common in web development. The call router 22 preferably stores state information in call router resources 29. The call router resources 29 are preferably accessible by the application server 26 and other devices through the call router API 28. The call router resources 29 are preferably similar to those described above. The call router 22 preferably associates each incoming phone number with a starting URI 23, more preferably the URI 23 is provided by the application server 26, still more preferably the URI 23 is provided by the application developer before a call is received at the call router 22 by associating the initial URI with the incoming call address (such as DID, SIP address, etc.) or by the application upon initiation of an outgoing call. The call router 22 preferably sends call data such as the caller number (obtained via Caller ID), caller geographic data (country, city, and/or state, zip) the number dialed, the time of the call, or any other suitable information or parameter. The call data is preferably digitally signed with a secret key 25 stored on the call router 22. A cryptographic hash of the information is preferably included along with the information as a digital signature. The call router 22 may also encrypt sensitive information (either before or after the cryptographic hash is computed) using the secret key to allow sensitive information to be sent across the network. The call data is preferably sent as an HTTP POST request to the application server 26. Call data may also be sent in URL (GET) variables, or encapsulated in HTTP headers.

An example HTTP request containing the information in the header is shown in FIGS. 4A and 4D. As shown in FIG. 4B, further inputs (such as voice recording or DTMF button pressing) from the PSTN-device may be subsequently submitted to the application server 26 as HTTP requests (GET or POST). As shown in FIG. 4C, the inputs from a phone keypad may be included in an HTTP GET request. As shown in FIG. 4E, the content of an SMS message received by the call router may be sent to the application server 26 as an HTTP request. As shown in FIG. 4F, the inputs from the text message are included in an HTTP GET request. The request data may alternatively be simultaneously sent in the URI (query string), message body (POST) and message headers, or any combination of the above.

The application server 26 functions to provide data processing logic for requests received from the call router 22. The application server 26 is preferably connected to the call router 22 via a network 24, more preferably via the Internet. The application server 26 is preferably a third party server operated outside of the system, but the system may alternatively include the application server 26. The URI 23 is preferably associated with an application server 26 or an application on an application server 26. The application server 26 preferably communicates with the call router 22 using an application layer protocol, more preferably using the HTTP protocol, or more secure HTTPS protocol. The application server 26 preferably receives HTTP requests from and sends HTTP responses to the call router 22. The application server 26 preferably runs on a standard stack of programming languages, hosting providers, operating systems and databases to handle HTTP requests, as if the caller were a website visitor in a web browser. The application server 26 also preferably verifies the digital signatures of the call data received in the requests using the secret key to compute a cryptographic hash from the received information and the hash received. If the computed hash and the received hash do not match, or no hash is received with the request, then the application server 26 preferably determines the request is fraudulent, and the request is preferably discarded. If the computed hash and received hash match, the application server 26 preferably determines that the request is authentic and proceeds further with the processing of the request. The application server may alternatively choose to ignore the hash if security is not important. The application server preferably uses call state data communicated by the call router request to determine the next call router instructions, without requiring call state stored on the application server. The application server may alternatively use call state data sent by the call router, such as the caller ID of the caller or the unique ID of the call, to reference additional or external state data, such as rows in a database or session data stored on the application server. The application server 26 preferably responds to HTTP requests received from the call router 22 by generating telephony instructions 27 for the call router 22. The application server preferably replies to the call router in XML, however, any suitable machine-readable message format may be used, including HTML, key/value pair text, delimited text or binary encoding. The XML preferably includes the telephony instructions 27 for the call router 22 such as connecting to another number, playing a recorded greeting, reading text, and/or requesting DTMF digit entry from the caller. The telephony instruction 27 may alternatively be related to SMS messaging, Multimedia Messaging Service (MMS) messaging, email, or any suitable messaging task. The telephony instruction 27 may additionally be used to send an outgoing SMS message, arrange a phone call from a specific phone number, arranging for a callback, setting up a conference call (connecting multiple numbers), sending an email, interfacing with a calendar or scheduling system, purchasing goods, or services, or any other suitable instruction. The XML instructions are preferably a set of commands to be executed in order, one at a time (i.e., sequentially). An example XML response is shown in FIGS. 5A and 5B. In single telephony session (e.g. one initiated by a PSTN-device or an SMS device) a response from an application server can initiate an outgoing telephony call and/or a SMS message. That is, a single XML response preferably provides the ability to interact with both the SMS network and the voice telephony network (PSTN, SIP/VoIP, etc) sequentially or simultaneously. In addition, audio or video files sent to the call router 22 can be converted to text by an automatic speech-to-text engine, human or other technique, and sent back in text form as an SMS message or an attachment to an MMS. In one variation, an application running on a server may be a simple static XML page and static sound files, deployed on basic web servers where no development or scripting environment is available. This variation preferably uses URI Templates (a current IETF proposal for HTML5), which essentially includes URLs with placeholders for variable data, like this: http://www.twilio.com/audio/{Digit}.mp3 where the call router 22 would substitute the digits pressed for the {Digit} placeholder in the URI Template, GET the file at the resulting URI, and play the static sound file in response. This allows an entire application to be authored offline in a What-You-See-Is-What-You-Get (WYSIWYG) html editor. For example, if the server response specifies the URI Template: http://demo.twilio.com/myapp/{Digits}.mp3, and the caller presses digits 1234, the call router 22 would GET the static mp3 file located at: http://demo.twilio.com/myapp/1234.mp3 and play it to the caller. The variables used for substitution in the URI Templates preferably correspond to the names of variables defined for state submission in HTTP GET, POST and/or header requests from the call router. From the previous example, {Digits} would be associated with a parameter named "Digits" that is preferably generated as a result of a "gather" telephony instruction (collection of DTMF digits). In the preferred embodiment for the second configuration, the call is initiated by the application server 26 (through the call router 22), and the second configuration 30 is substantially similar to the first configuration 20, such that the call routing is preferably handled identically to an incoming call, namely via URI requests from call router 22 to the server 26 upon call state changes. The application server preferably additionally is able to make calls to the Call Router API as described above.

3. Example Applications

Figure 10:
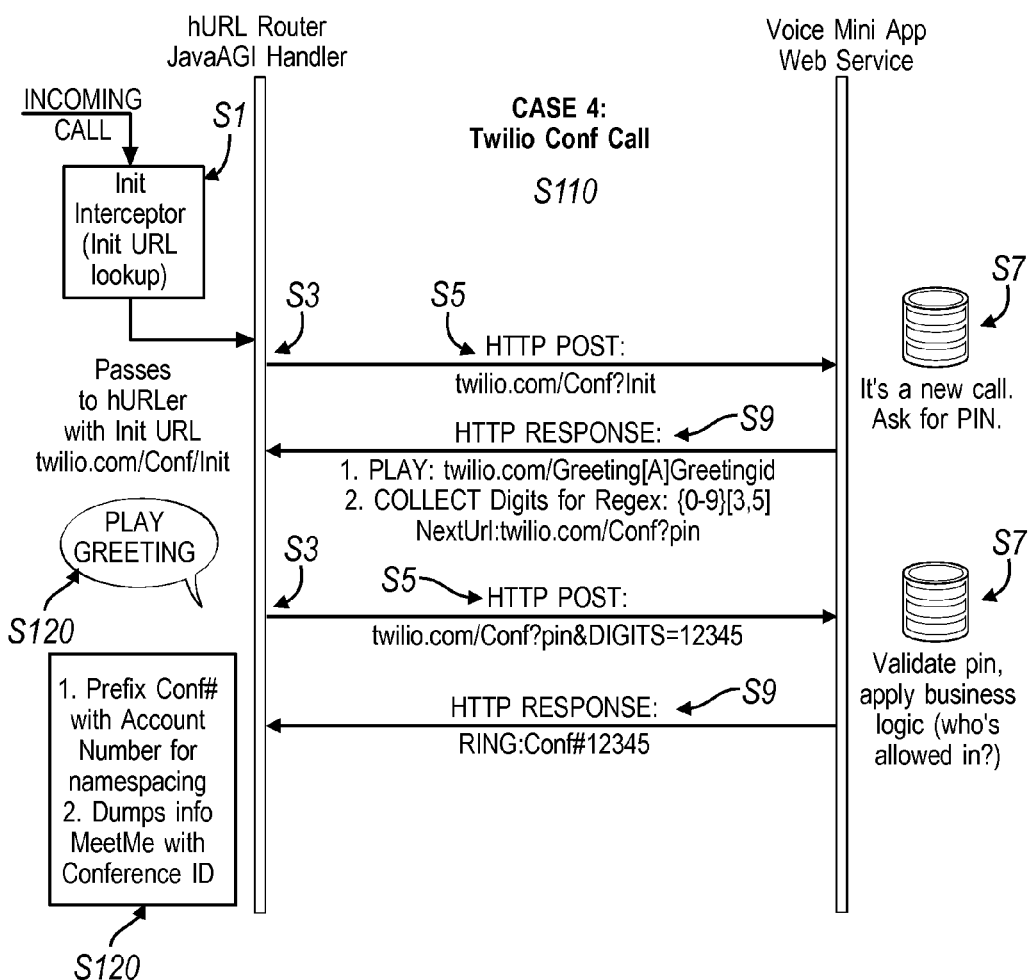
Figure 11:
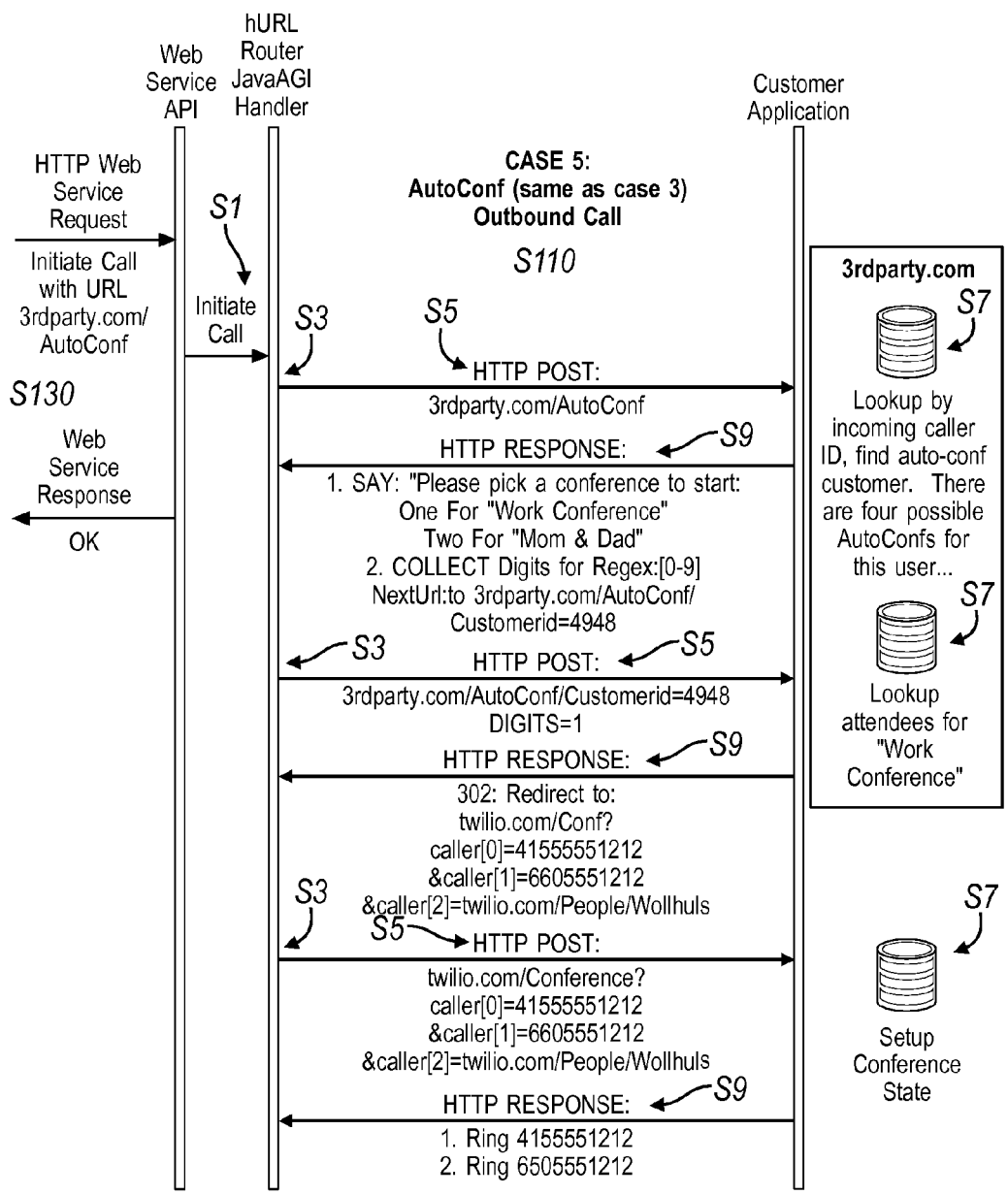

Call router applications are preferably web applications, implementing the most common phone system features with full APIs for administration. Each Call Router Application object has a unique URI. A call may be transferred to that object instance by specifying its URI as a call destination. The call router applications preferably include: the AutoAttendant application (in FIG. 7), the Follow Me application (in FIG. 8), the Conference application (in FIG. 9), the AutoConference application (in FIGS. 9-11), the Device application, the Person application, the VoicemailBox application, the Group application, and the Queuing application (in FIG. 12).

Figure 7:
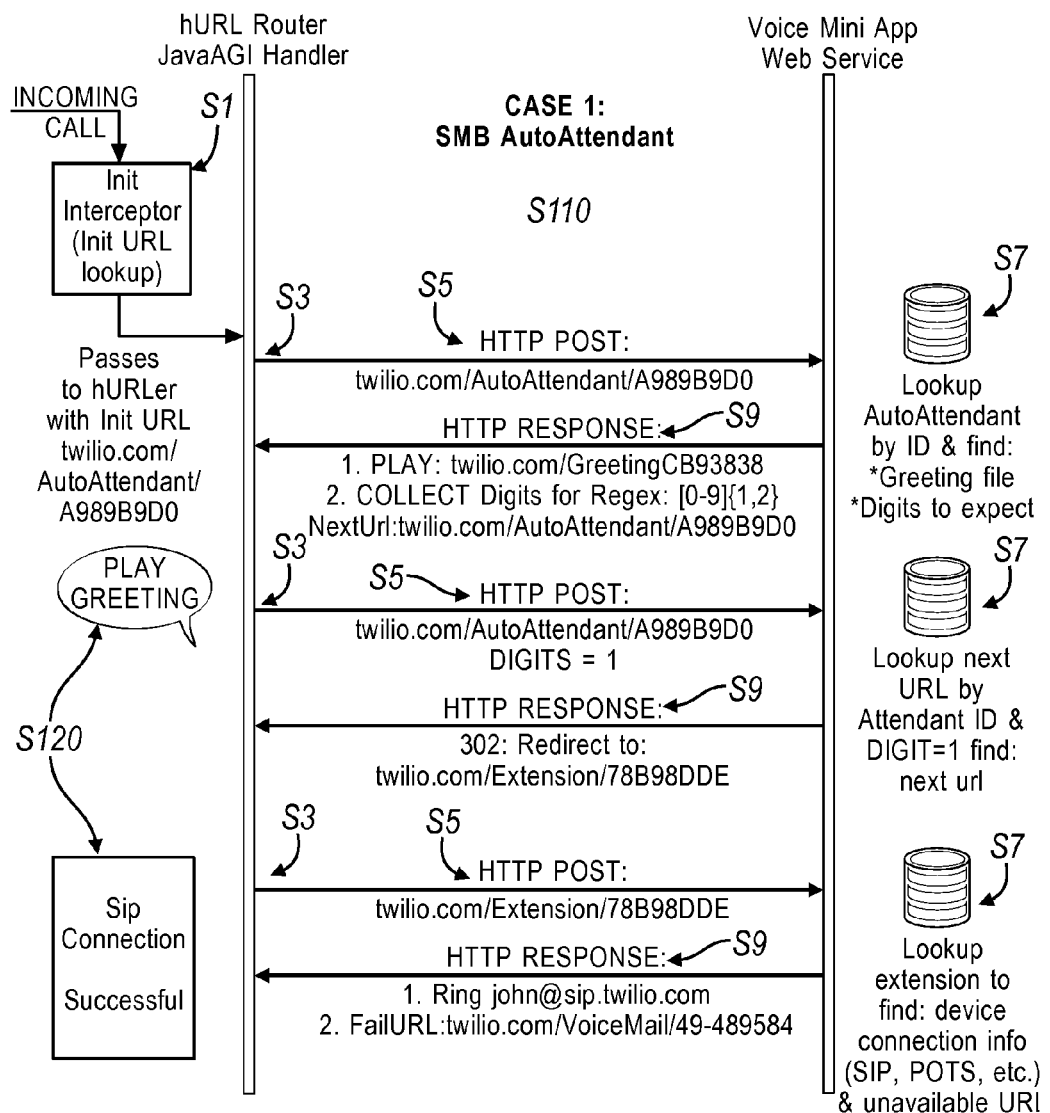
FIGS. 7-15 are schematic representations of various applications that incorporate the principals of the preferred method of the invention.

The AutoAttendant application, as exemplified in FIG. 7, plays a recorded greeting, and waits for the caller to press one or more digits on the keypad. Based on the input, the AutoAttendant preferably directs the call to another AutoAttendant, one or more phones of a person, a voicemail box or any other valid calling destination.

Figure 8:
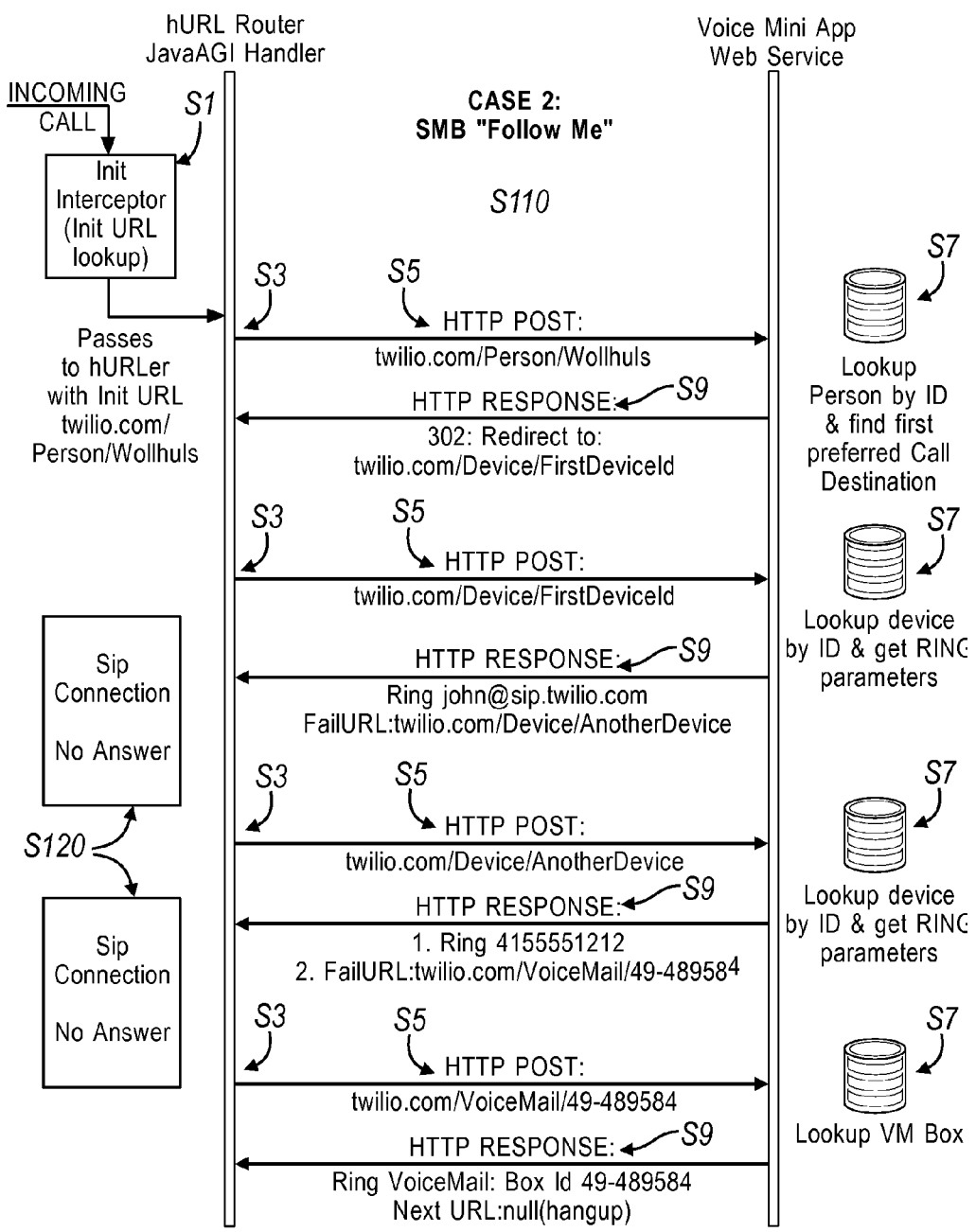

The Follow Me application, as exemplified in FIG. 8, enables a person to be reached at multiple devices, such as a work number, a cellular phone number, a landline, and/or a VoIP device. The Follow Me Application preferably calls these devices in order or simultaneously in an attempt to reach the person.

The Stay With Me application enables a person to transfer an in-progress call between multiple phone devices, such as a cellular phone and a home phone. For example, a user may wish to transfer a call from a more expensive cellular call to a less expensive landline phone, or may wish to transfer a call to a landline phone if a cellular phone battery is running low.

Figure 9:
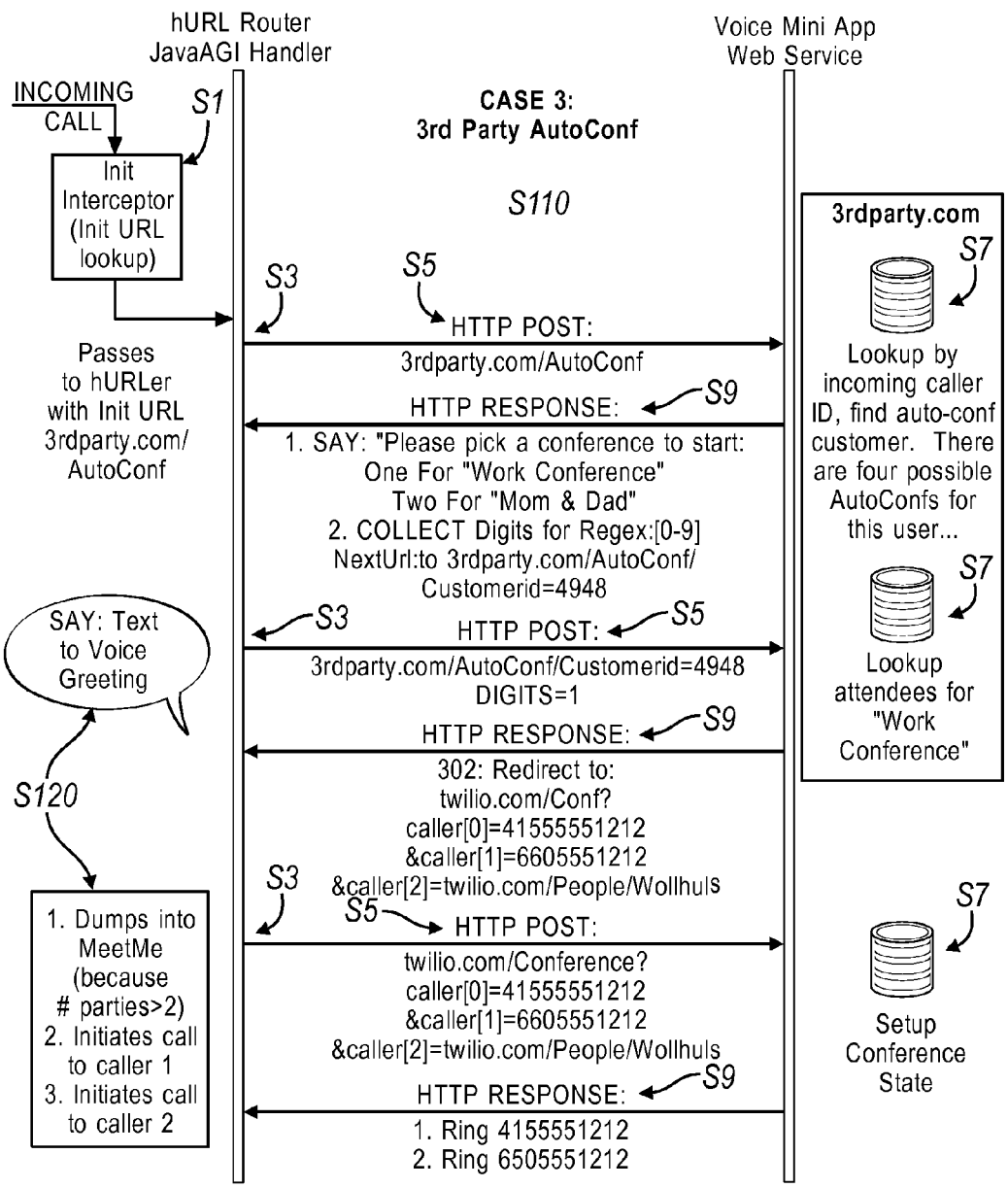

The Conference application, as exemplified in FIG. 9, preferably allows three or more callers to participate in a call simultaneously, while providing mechanisms to control who can join and speak during the call. The Conference application may alternatively or additionally incorporate SMS messaging control. The Conference application upon receipt of an SMS message including multiple phone numbers, may initiate a conference call to one or more parties, using the single SMS.

The AutoConference application preferably allows a conference administrator to initiate a conference call with two or more parties by performing one action, such as selecting a button on a website, selecting a button on a phone device, dialing a phone number, or scheduling the call prior to its initiation. Examples of the AutoConference application implemented using the preferred method of the invention are shown in FIG. 9 (viewed from the PSTN-device side), FIG. 10 (viewed from the application server side), and FIG. 11 (initiated by an application server using the call router API).

The Device application represents a telephone used within the phone system, and may be a hard phone (hardware) or soft phone (software), a VoIP phone or a traditional PSTN phone. The Device application handles configuration details and device status (Do Not Disturb, Busy, etc.).

The Person application represents a human-being user of a telephone system. The Person may have one or more extensions, devices, and/or voicemail boxes, and may have a preferred order in which to ring their phones or voicemail. A person may have a username and password with which to login and update these settings.

The VoicemailBox application preferably plays a greeting, and allows the caller to record a message. Once complete, the recorded message may be stored for later listening, emailed as an audio link or attachment, or both. A list of current messages for a VoicemailBox may be retrieved by dialing in, via API, via RSS feed, and/or any other suitable method or device. In one variation, the audio recording may be automatically transcribed, transforming speech to text. The text is preferably included in the email or text message along with the audio link, attachment, and/or retrievable later by any suitable means of the API.

The Group application preferably represents a logical grouping of other Call Router Application objects, including other Groups. The Group preferably defines the behavior of calls directed to the group, including queuing, hunting for the first available party, and simultaneously ringing multiple parties.

Figure 12:
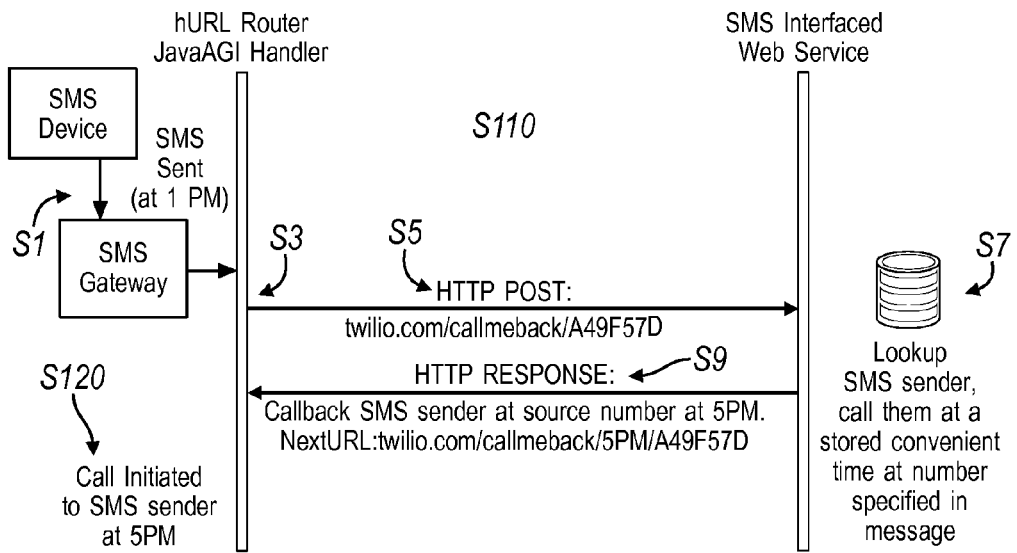

The Queuing application preferably, upon receipt of a phone call or an SMS message, enters the message sender to a telephony call queue and the message sender is called back via the PSTN, SIP/VoIP network or other telephony network, as exemplified in FIG. 12. The call may be placed either at the message' originating number or another pre-specified number, either when a human/operator/service is available (customer service applications) at a pre-scheduled time, such as a wake-up call, anniversary reminder, birthday reminder.

The call router applications may additionally or alternatively include:

a Busy Signal Buster service that, upon receipt of an SMS message or phone call transmitting a number to be called that is currently busy, and calls the SMS message sender back at the message' originating number or another pre-specified number when the number is no longer busy;

a SMS Reader/TTY application that, upon receipt of an SMS, translates the text into audio, using a text-to-speech engine to a caller or the members of an audio conference (e.g., to tell them you will join the call in a few minutes), or for the hearing impaired to use instead of TTY services;

a Translation application that, upon receipt of an SMS message containing a phrase in a language, translates the language of the SMS message into another language (either manually by a human or automatically by a program) and sends a response message via SMS or email; and a Programming application that, upon receipt of an SMS message containing programming code, could compile the code and execute the code, update a website, update a programming project, return data from a database, return a generated computer graphics object as an MMS message, or any other suitable program compilation or computation.

The call router applications may additionally or alternatively include a Status/Notification application that allows users to get or send the status of an object, task, or process by sending an SMS message and receiving a call back via the PSTN, SIP/VoIP network or other telephony network. The service may be used by an operator sending an SMS message with the name of a particular server and then get a call back on her mobile phone and hear the status of that server read aloud. The service may also be used for notification, i.e. to call other parties. For example, a store manager may want to let employees know what time a store is opening the next day. The manager could send an SMS message that would then call each employee and tell him or her over the phone the time when the store was opening the next day, and or what time they needed to arrive at work.

The call router applications may, however, include any collection and/or permutation or these or other suitable pre-built telephony functions and features.

Applications of the preferred method may include simple PBX functionality, such as auto-attendant voice menus, employee extensions, and voicemail features. The application may also include other, unconventional, applications such as an Interactive Hold application, a Conference Calling application, an Independent Music Hold Channel, a Voting/Fundraising application, a Sales Application, a Blog by phone service and a Call Annotation application.

The Interactive Hold application preferably includes interactive activities, such as a playing a quiz game to be played while on hold (with or without the ability to be played against other callers), listening to news headlines or podcasts of the choice of the listener, and using a phone keypad as a synthesizer to create music in realtime. The Conference Calling application may, as an example, include selecting particular (or random) users from a phone book and instantly substantiating a conference call to the group, with the ability to save the group for future calling. The Independent Music Hold Channel preferably allows independent artists to upload, classify, and grant permission for their works to be played while a caller is on hold. The Voting/Fundraising application preferably connects willing callers (calling to encourage voting or to raise funds for a cause), to potential voters and/or donors respectively, preferably including an interface for the caller to display information about the voter/donor and to make notes about the voter's response to the call. The Sales Application preferably allows sales organizations to quickly integrate inbound and outbound calls with customer relationship management (CRM) applications, or read order details from a shopping cart application. Finally, the Call Annotation application allows call participants to append meta-data, such as reference URIs used in the phone conversation, to a specific call and a timestamp within the call. Participants on the call with a suitable user agent could view the annotations during the call, and people listening to a later replay of the call audio could also receive such annotations at the same timestamp during the playback. The Call Annotation may be used, for example, to facilitate conference call note taking, employee training, sales team collaboration, and/or customer support collaboration.

Applications may alternatively include hold or park functionality, where a caller is placed in a waiting state until an external event resumes the call, such as another party becoming available. One variation of this application is the call queue, where callers wait for an available attendant to answer a call. Applications of the preferred method may alternatively include other conventional or unconventional PBX functionality.

As a person skilled in the art will recognize from the previous detailed description and from the figures and claims, modifications and changes can be made to the preferred embodiments of the invention without departing from the scope of this invention defined in the following claims. It is possible, and indeed hoped, that additional applications will be designed and built upon this technology platform (the preferred method and/or system of the invention) that would not otherwise be possible using conventional telephony platforms.

We claim:

1. A method of processing telephony sessions comprising:
communicating with an application server using an application layer protocol;
processing telephony instructions with a call router;
creating call router resources accessible through a call router Application Programming Interface (API), wherein the call router resources are accessible by outside devices at an addressable Uniform Resource Identifier (URI);
mapping a telephony session to the URI, the URI being associated with the application server;
sending a request to the application server;
embedding state information of the telephony session in the request;
receiving from the application server a response comprising telephony instructions for sequential processing;
storing state information in the URI of a call router resource;
modifying call router resources to alter the state of the call router; and
interacting with media of the call router according to the call router API.

2. The method of claim 1, further comprising embedding state information of the telephony session into the URI.

3. The method of claim 2, wherein all state information required by the application server is embedded in the URI.

4. The method of claim 1, wherein sending and receiving are performed using a Hypertext Transfer Protocol (HTTP).

5. The method of claim 4, wherein the telephony instructions are encoded in Extensible Markup Language (XML).

6. The method of claim 1, further comprising sending a digital signature with the request, wherein the digital signature is adapted to be used for account verification by the application server.

7. The method of claim 6, wherein the digital signature is a cryptographic hash generated by a key, wherein the key is shared by a call router and the server, and wherein the cryptographic hash is included in the URI.

8. The method of claim 1, further comprising initiating the telephony session from a phone number through the Public Switched Telephone Network (PSTN).

9. The method of claim 1, further comprising initiating the telephony session from a message received from a Short Message Service (SMS) system.

10. The method of claim 1, further comprising initiating the telephony session by an application server through the call router API; wherein the initial URI mapped to the telephony session is provided by the application server.

11. The method of claim 1, wherein the call router API is substantially a Representational State Transfer (REST) API.

12. The method of claim 1, wherein the telephony session includes a sent Short Message Service (SMS) message.

13. A method comprising:
communicating with an application server using an application layer protocol;
processing telephony instructions with a call router;
creating call router resources accessible through a call router Application Programming Interface (API), wherein the call router resources are accessible by outside devices at an addressable Uniform Resource Identifier (URI);
mapping a telephony session to the URI, the URI being associated with the application server;
sending a request to the application server;
embedding state information of the telephony session in the request;
receiving from the application server a response comprising telephony instructions for sequential processing;
receiving an API request from the application server for interaction with a resource; and
responding to an API request based on the interaction with a resource.

14. The method of claim 13, including creating a resource selected from the group consisting of: a call resource, a media resource, an incoming address resource, an account resource, and a caller identification (ID) resource.

15. The method of claim 14, further comprising:
altering the state of the telephone session with the call resource;
accessing media with the media resource;
modifying incoming addresses with an incoming address resource;
modifying account information with the account resource; and
modifying caller ID information with the caller ID resource.

16. The method of claim 14, wherein the telephony instruction is selected from the group consisting of: connecting to a telephony device, playing a media file, converting text to speech, sending a SMS message, sending a Multimedia Messaging Service (MMS) message, detecting input from a telephony device, and connecting to a new URI.

17. The method of claim 15, further comprising setting the initial URI associated with an inbound incoming address.

18. The method of claim 17, wherein a direct inward dialing (DID) number, a SMS short code, or a Session Initiation Protocol (SIP) address is used as the inbound incoming address.

19. The method of claim 13, including creating a call resource; wherein the call resource is used for altering a connection of the telephony session.

20. The method of claim 19, wherein altering a connection of a call session includes: joining telephony sessions, splitting a telephony session, and transferring a telephony session.

* * * * *